(12) United States Patent
Chen et al.

(10) Patent No.: US 9,074,885 B2
(45) Date of Patent: Jul. 7, 2015

(54) LIQUID CAPACITIVE MICRO INCLINOMETER

(71) Applicant: Sagatek Co., Ltd., Taipei (TW)

(72) Inventors: Jung-Hsiang Chen, Taipei (TW); Cheng-Szu Chen, Taipei (TW); Bo-Ting Chen, Taipei (TW)

(73) Assignee: SAGATEK CO., LTD., Taipei (TW)

( * ) Notice: Subject to any disclaimer, the term of this patent is extended or adjusted under 35 U.S.C. 154(b) by 153 days.

(21) Appl. No.: 14/038,909

(22) Filed: Sep. 27, 2013

(65) Prior Publication Data

US 2014/0082953 A1    Mar. 27, 2014

(30) Foreign Application Priority Data

Sep. 27, 2012 (TW) .............................. 101135550 A

(51) Int. Cl.
*G01C 9/20* (2006.01)
*G01C 25/00* (2006.01)

(52) U.S. Cl.
CPC *G01C 9/20* (2013.01); *G01C 25/00* (2013.01); *Y10T 29/49155* (2015.01)

(58) Field of Classification Search
CPC ..... G01C 9/20; G01C 25/00; G01C 2009/062
USPC ............... 33/366.15, 366.18, 366.19, 366.22
See application file for complete search history.

(56) References Cited

U.S. PATENT DOCUMENTS

| | | | |
|---|---|---|---|
| 5,237,753 A * | 8/1993 | Carlson et al. | 33/366.14 |
| 6,449,857 B1 * | 9/2002 | Anikolenko | 33/366.11 |
| 2007/0261258 A1 * | 11/2007 | Ahn et al. | 33/366.19 |
| 2011/0239476 A1 * | 10/2011 | Ekchian | 33/366.19 |
| 2012/0266470 A1 * | 10/2012 | Ekchian | 33/377 |
| 2013/0160547 A1 * | 6/2013 | Lee et al. | 73/514.28 |

* cited by examiner

*Primary Examiner* — G. Bradley Bennett
(74) *Attorney, Agent, or Firm* — Bacon & Thomas, PLLC

(57) ABSTRACT

The present invention relates to a liquid capacitive micro inclinometer, comprising a pair of differential electrodes and a common electrode, all formed in the same plane in a sealed chamber. Immersing liquid is filled in the sealed chamber. The shape of the differential electrodes forms a sector of a circular plane. The inclinometer may further integrate a reading circuit. The present invention also discloses preparation method for the invented inclinometer.

33 Claims, 5 Drawing Sheets

LIQUID CAPACITIVE MICRO INCLINOMETER

FIELD OF THE INVENTION

The present invention relates to a micro inclinometer, especially to a liquid capacitive micro inclinometer.

BACKGROUND OF THE INVENTION

The inclinometer (tilt meter) has a wide range of applications, such as position determination in construction engineering, level measurement for mechanical platforms, monitoring of balancing system for automotive and aircrafts, monitoring in inclination and deformation of bridges and railroads, generating auxiliary horizontal lines for viewfinders of camera, tilt control and applications of handsets etc. It is also useful in the technical fields of semiconductor, chemical and biomedical engineering. The conventional micro inclinometers is divided into three types, according to their method of detection. They are: The mechanical inclinometer, the gas inclinometer and the liquid capacitive inclinometer.

The mechanical inclinometer comprises a mass block. The mass has two electrodes at its two ends, which interacts with two corresponding fixed electrodes under the influence of the gravity force, when the inclinometer tilts. The capacitance created by each pair of the fixed electrode and the mass electrode varies in response to the tilt angle of the inclinometer and is used to measure the tile angle of the inclinometer. The mechanical inclinometer is easy to fabricate but the spring that supports the mass block is fragile and tends to break when external forces are applied.

The gas inclinometer provides a sealed chamber, in which reference gas is enclosed. Heaters are used to heat the reference gas, whereby when the inclinometer tilts, the thermal convection in the sealed chamber varies. Variations in resistance at the thermistors adjacent to the heaters are used to calculate the tilt angle of the inclinometer. The gas inclinometer has a relatively simple structure and the reliability is not easily impacted by the dimensional variation of the microstructure. It, however, has drawbacks in that an additional sealing process of the chamber is required and that its reaction speed is relatively slow.

The conventional liquid capacitive micro inclinometer has a sealed chamber, in which electrolyte liquid is filled. The electrolyte liquid is conductive. Two electrodes partially immersed in the electrolyte liquid have substantially the same resistance, when the chamber is not tile. When the chamber inclines, areas of the electrodes immersed in the liquid vary relatively, such that differences in resistance of the two electrodes are generated. A reading circuit converts the variation of the tilt angle into electrical signals, whereby the tilt angle is known. The liquid inclinometer is simple in structure and fast in reaction but in fabricating the inclinometer, an additional sealing step of the chamber is required.

Most inclinometers are fabricated in two parts. The sensor part is fabricated in an MEMS (microelectromechanical system) process and the reading circuit is fabricated in a CMOS (complementary metal-oxide semiconductor) process. The two-part fabrication process is not only costly but also makes further condensation of the inclinometer difficult or impossible. A single-step MEMS process enables the design flexibility of the microstructure. Yet there is no standardized MEMS process that provides both flexibility in design and compatibility with necessary circuits at the same time.

Taiwan Patent No. 522221 discloses an inclinometer that comprises a printed circuit board and a pair of differential electrodes electrically independent from each other. The pair of differential electrodes and a common electrodes are enclosed in a sealed chamber and the sealed chamber is filled with dielectric liquid. When the inclinometer tilts, areas of differential electrodes that are immersed in the dielectric liquid vary, resulted in variations in the capacitance generated by each differential electrode and the common electrode. The capacitance of each differential electrode is measured to calculate the tilt angle. Such inclinometer is not fabricated in the MEMS process, therefore is bulky.

Japan published patent application JP 2008-261695 discloses a micro inclinometer that uses the same theory of the TW 522221 and has a structure similar to that of the TW 522221, while the liquid filled in the chamber is a conductive liquid. The micro inclinometer is fabricated using the MEMS process, therefore has a microstructure. However, the structure disclosed in JP 2008-261695 is not suitable for the standard CMOS process. Therefore, its production cost is relatively high. In addition, its differential electrodes are semicircular in shape, whereby its sensing accuracy is limited; the inclinometer so prepared is not for sophisticate applications. Nevertheless, the sensor and the reading circuit are prepared separately, making their integration difficult.

OBJECTIVES OF THE INVENTION

The objective of this invention is to provide a novel structure of the liquid capacitive micro inclinometer.

Another objective of this invention is to provide a simplified structure of the liquid capacitive micro inclinometer that may be fabricated using the standard CMOS process.

Another objective of this invention is to provide a liquid capacitive micro inclinometer with integrated reading circuits.

Another objective of this invention is to provide a liquid capacitive micro inclinometer that has substantially no moveable element, while providing high precision in measurement.

Another objective is to provide a novel method for the preparation of a liquid capacitive micro inclinometer.

Another objective is to provide a method for preparation of a liquid capacitive micro inclinometer using the standard CMOS process, whereby the reading circuits are integrated with the microstructure.

SUMMARY OF THE INVENTION

According to the present invention, a novel structure of the liquid capacitive micro inclinometer is provided and comprises: a pair of differential electrodes and a common electrode, all positioned in substantially a same plane in a sealed chamber. Immersing liquid is filled in the sealed chamber. Each differential electrode has a shape of a partial circular plane, preferably a semicircular shape. The inclinometer may further comprise a reading circuit to generate reading values of capacitance corresponding to each differential electrode. A lubrication layer may further be provided in at least a part of surface of the differential electrodes and/or the common electrode. The common electrode may be provided adjacent to the differential electrodes. The differential electrodes may comprise a plurality of notches at their edge, while the common electrode may comprise a plurality of extruders extended into the plurality of notches. If the shape of the differential electrodes is a sector circular plane, the notches may extend to over half radius of the circular plane. The immersing liquid may be conductive or dielectric. The differential electrodes and the common electrode may be formed on one silicon substrate. The reading circuit may also be formed on the same silicon substrate of the differential electrodes and the common electrode. The pair of differential electrodes and the common electrode may be formed on a dielectric layer formed on one silicon substrate.

In some embodiments the differential electrodes have the shape of a sector of a circular. In such embodiments, the inclinometer includes more than one pair of differential electrodes, in which the shape and area of the differential electrodes may be identical or different.

The method for preparation of liquid capacitive micro inclinometer according to this invention comprises the steps of:
preparing a first substrate;
forming on the first substrate at least one metal layer.
processing the at least one metal layer to form a pair of first and second electrodes having similar shapes and substantially same area and a third electrode;
preparing a second substrate;
forming a material layer on the second substrate;
forming a space in the material layer;
filling an immersing liquid into the space in the material layer;
overlapping the first substrate on the second substrate, such that the first, second and third electrodes are contained in the space in the material layer; and
combining the first and second substrates.

The pair of first and second substrate may have the shape of a partial circular, preferably the shape of a semicircular. In one embodiment of this invention, the differential electrodes have the shape of a sector of a circular. In such embodiments, the method includes the step of forming additional pair or pairs of first and second electrodes, at the same time when the pair of first and second electrodes is formed. The shape and area of the differential electrodes may be identical or different.

The first substrate may be a silicon substrate, while the second substrate may be a glass substrate or a plastic substrate. The third electrode is formed adjacent to the first and second electrodes. The first and second electrodes may include notches provided at their edges, while extruders may be provided in the third electrode, so that the extruders extend into the notches. If the shape of the first and second electrodes is a sector circular plane, the notches may extend to over half radius of the circular plane. The immersing liquid may be conductive or dielectric.

The first, second and third electrodes may be formed in a material layer of the first substrate. In such a case, the invented method further comprises a step of forming a material layer on the first substrate after the first substrate is prepared. This material layer may include at least one dielectric layer. The material layer may further comprise at least one metal layer and an additional dielectric layer.

The invented method may include a step of forming a reading circuit, when the first, second and third electrodes are formed. The method may also include a step of forming a reading circuit, when the first, second and third electrodes and the material layer are formed. The method may further include a step of applying a lubrication layer on least a partial surface of the first, second and third electrodes.

The material layer formed on the second substrate may be photoresist, therefore, the step of forming the space may include a step of removing a part of the material layer.

BRIEF DESCRIPTION OF THE DRAWINGS

These and other objectives and advantages of this invention will be clearly appreciated from the following detailed description by referring to the following drawings.

DETAILED DESCRIPTION OF THE INVENTION

In the followings detailed description of the invented liquid capacitive micro inclinometer will be given by its preferred embodiments. It is appreciated that description to the preferred embodiments serves to illustrate examples of the present invention, without limitation to its scope of protection.

Figure 1:
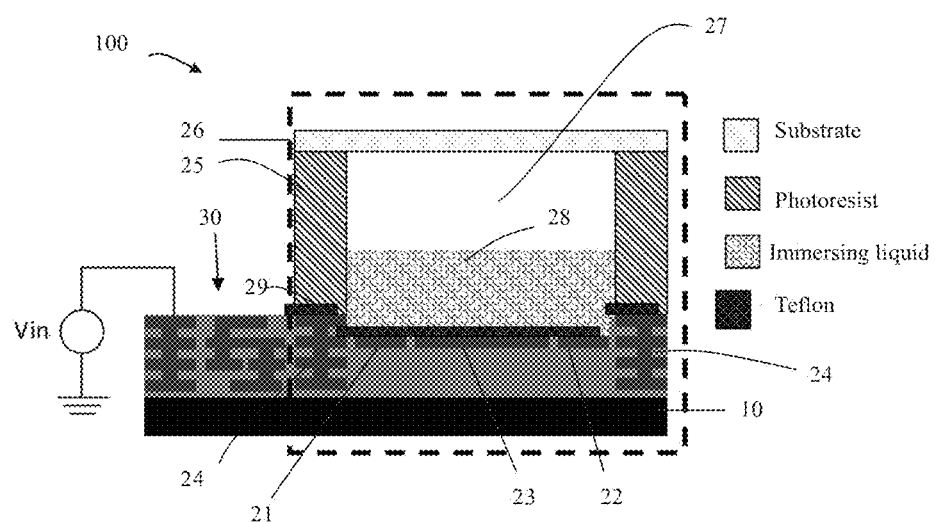
FIG. 1 illustrates the cross-sectional view of the liquid capacitive micro inclinometer according to this invention.

FIG. 1 shows the cross-sectional view of the liquid capacitive micro inclinometer according to this invention. FIG. 1 serves to illustrate the main structure of the invented liquid capacitive micro inclinometer. As shown in this figure, the inclinometer 100 of this invention is prepared on a first substrate 10. The first substrate 10 shown in this future is a substrate to be processed in the standard CMOS process, i.e., the silicon substrate. On the substrate a plurality of alternative dielectric layers and metal layers and a plurality of vias will be prepared.

Figure 2:
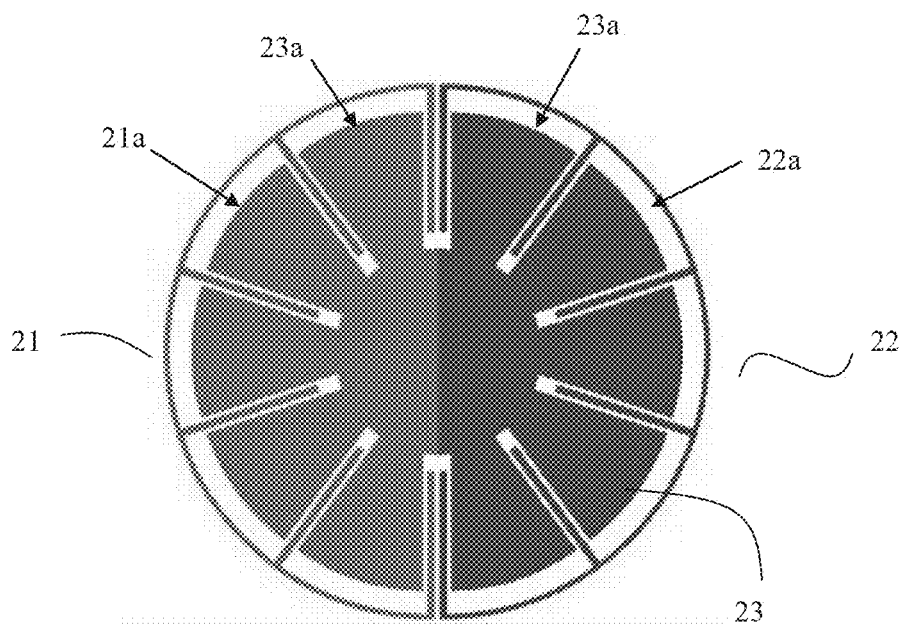
FIG. 2 shows one example of the electrodes used in the liquid capacitive micro inclinometer of this invention.

FIG. 2 shows one example of the electrodes used in the liquid capacitive micro inclinometer of this invention. As shown in this figure, the inclinometer 100 includes a pair of differential electrodes, i.e., first electrode 21 and second electrode 22, and a common electrode, i.e., third electrode 23. In the example shown in FIG. 1, the 3 electrodes 21, 22, 23 of the inclinometer are formed in the same metal layer, i.e., the third metal layer. At the peripherals of the region occupied by the 3 electrodes 21, 22 and 23, support structure 24 consisted of a plurality of dielectric layers, a plurality of metal layers and a plurality of vias is formed. Partition walls 25 are formed on the support structure 24. A second substrate 26 covers the partition walls 25, to form a sealed chamber 27, defined by the metal layer wherein the 3 electrodes are formed, the support structure 24, the partition walls 26 and the second substrate 26. Immersing liquid 28 is filled in the chamber 27 so defined.

In the preferred embodiments of this invention, the partition walls 25 are made from photoresist materials and the second substrate 26 is a glass substrate. This, however, is not any technical limitation; other materials may be used to prepare the partition walls and the second substrate.

Parasite capacitance generated by the differential electrodes and the substrate may be reduced, if the 3 electrodes 21, 22, 23 are prepared in the third metal layer. Of course, the electrodes 21, 22, 23 may be prepared in another or other metal layers. In this example, the 3 electrodes 21, 22, 23 are prepared in a single metal layer, while in other examples, the 3 electrodes 21, 22, 23 are formed in a plurality of metal layer, i.e., a plurality of metal layers with a dielectric layer sandwiched by two metal layers, all prepared in the standard CMOS process. In addition, the common electrode 23 preferably shares a metal layer with the pair of differential electrodes 21 and 22. Of course, this is not compulsory.

In order to reduce the capillary action that adheres the immersing liquid onto the surface of the differential electrodes 21, 22 and the common electrode 23, a lubrication layer (not shown) may be applied to the full surface or selected regions thereof, of the electrodes. Material for the lubrication layer may be any known material, such as Teflon. Any method may be used to combine the first substrate 10 and the second substrate 26, by aligning them with the assistance of any suitable tool. If adhesive is used, material of the adhesive may be any that is compatible with the partition walls 25 and the metal layers or the dielectric layers. It is also possible to fix the second substrate 26 to the first substrate 10 with pressure or by heating, whereby an interface layer 29 between them will be formed.

Refer to FIG. 2, in which each differential electrode 21, 22 forms a semicircular plane. A plurality of notches 21a, 21a and 22a, 22a is formed in each differential electrode, extending from the internal edge (the edge facing the common electrode) of the differential electrodes 21, 22. At the same time, the common electrode 23 has a main body formed in the central region of the differential electrodes 21, 22 and a plurality of extruders 23a, 23a extending into the notches 21a, 21a and 22a, 22a of the differential electrodes 21, 22. The structure including the differential electrodes 21, 22 and the common electrode 23 is equivalent to an "interdigital capacitor." In the example of FIG. 2, differential electrodes 21, 22 are formed substantially semicircular, whereby range of detection of the inclinometer is extended to ±90°. Of course, in most applications range of detection is not necessarily as wide as ±90°. Therefore, the shape of the differential electrodes 21, 22 forms only sector of a semicircular plane, such as sector of an angle from 45° to 90°. In addition, electrodes of a pair preferably have identical or similar shape and substantially identical regional area and they are preferably positioned at opposite sides of a line perpendicular to the basic plane to be measured. Such arrangements ensure preciseness in tilt angle detection.

In other embodiments of this invention, the shape of the differential electrodes 21, 22 does not form part of a circle. Any arrangement that forms differential electrodes of a pair in substantially corresponding shapes, without impacting the precision of their detection, would be acceptable. Suitable shapes include equilateral triangle, isosceles triangle, isosceles polygon etc.

As shown in FIG. 2, the notches formed in the differential electrodes 21, 22 extend deep into internal of the electrodes, i.e., over half-length of them. To be precise, when the shape of the differential electrodes 21, 22 is sector of a semicircular plane, the notches extend to over half of the radius of a imaginative circle defined by the differential electrodes 21, 22. At the same time, the extruders of the common electrode 23 extend deep into the notches, reaching at over half of the above-mentioned radius. The structure of the invented electrode assembly produces greater capacitance and provides higher sensitivity in tilt angle detection, therefore is useful in detections where higher precision or resolution is needed.

Figure 6:
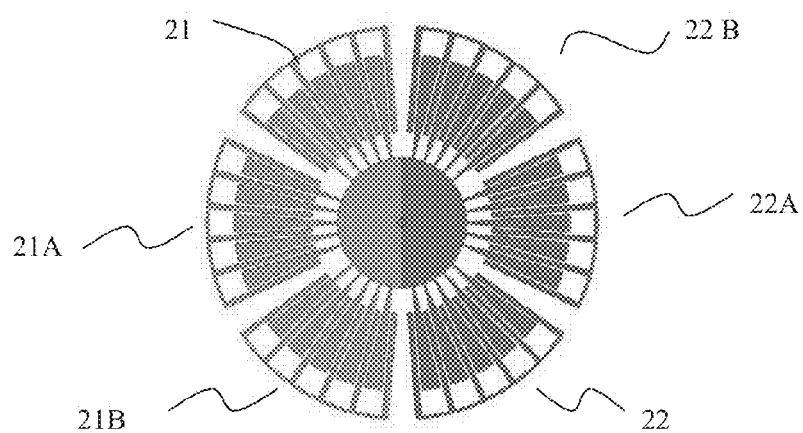
FIG. 6 shows another example of the electrodes used in the liquid capacitive micro inclinometer of this invention.

Now refer to FIG. 6, wherein another example in the shape of the differential electrodes is shown. In the example of FIG. 6, the shape of the first and second electrodes 21, 22 forms sector of a semicircular, while additional pairs of differential electrodes, i.e., second pair electrodes 21A, 22A and third pair electrodes 21B, 22B, are prepared, with each differential electrode having a shape and a regional area substantially identical to that of first and second electrodes 21, 22. In such examples, the second and third pair electrodes may be formed at the same time when the first pair is formed. In addition, number of the pairs is not limited to any particular number. It is also possible to prepare the electrodes, so that they have different shape and area. These examples provide multiple pair of electrodes, so that variations in tilt angle detected by each pair of differential electrodes may be expressed in a matrix. As a result, slight variations in tilt angle may be detected in a simplified way. In other words, slight variations in tile angle may be detected, without the need of enhancing detection resolutions in the capacitance.

The inclinometer of the present invention as described above may be fabricated in the standard CMOS process. The microstructure of the inclinometer may be fabricated on the same substrate along with its reading circuits in the same process. The invented inclinometer does not only reduce its fabrication costs but also provides solutions for the integration of the tilt angle detector and the reading circuits.

Figures 3A, 3B:
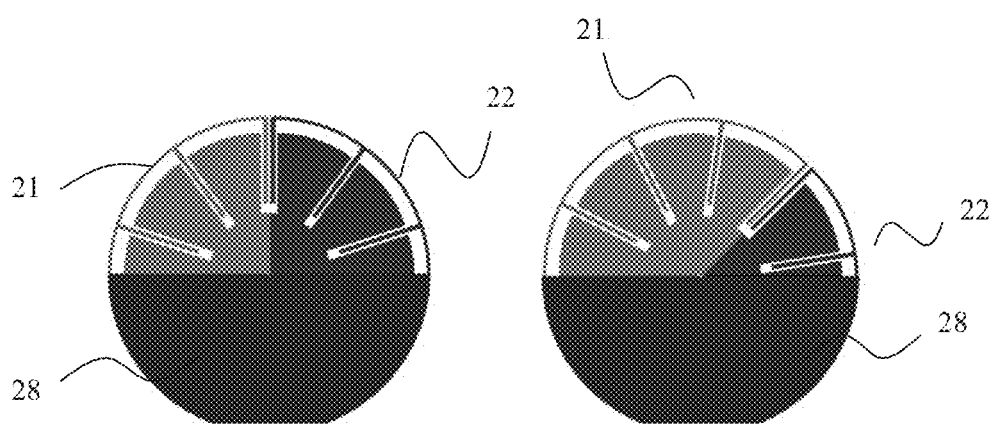
FIGS. 3a and 3b illustrate the detection theory of the invented liquid capacitive micro inclinometer.

FIGS. 3a and 3b illustrate the detection theory of the invented liquid capacitive micro inclinometer. In FIG. 1, Vin is the input voltage and 30 is the reading circuit. The detector 100 shown in FIG. 3 is equivalent to 2 capacitors. The relative position of the immersing liquid 28 and the differential electrodes 21, 22 changes, when the tilt angle of the inclinometer varies. When this happens, areas of the related differential electrodes immersed in the immersing liquid vary relatively, whereby capacitance represented by the respective differential electrodes varies accordingly. The variations in capacitance are read out by the reading circuit 30 and the results are output in the form of voltage signals. In FIG. 3a, the inclinometer is in its initial status, wherein each differential electrode 21, 22 has the same area immersed in the immersing liquid 28. In this initial status, capacitance represented by the differential electrodes 21, 22 is substantially the same, or may be defined as identical.

When the inclinometer 100 tilts as shown in FIG. 3b, the immersing liquid remains its position due to the gravity, while the area of the differential electrodes 21, 22 immersed in the liquid varies, which makes capacitance represented by the respective differential electrodes 21, 22 varied accordingly. According to this invention, the variation of the capacitance is in a linear relation with the tilt angle of the inclinometer. Tilt angles of the inclinometer may thus be measured by calculating difference in capacitance represented by the respective electrodes 21, 22.

Figure 4:
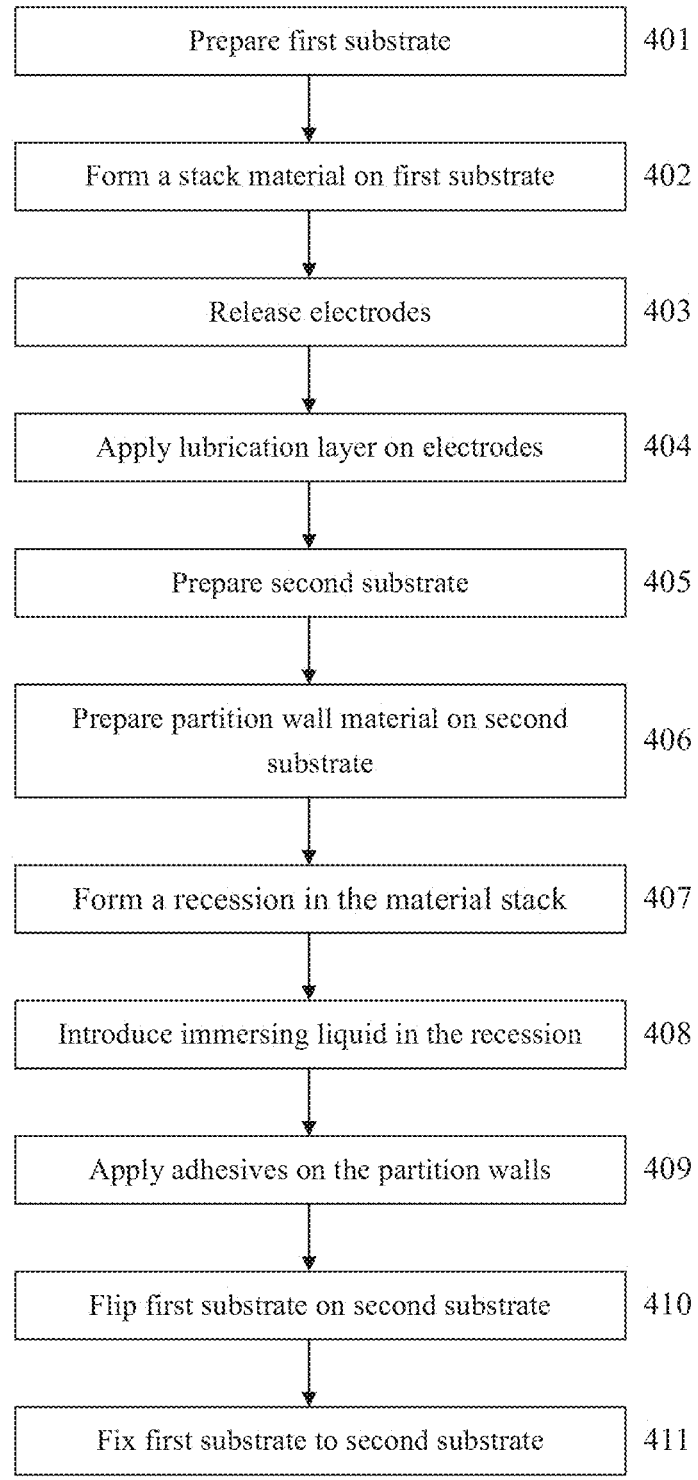
FIG. 4 shows the flowchart of method for fabrication of the invented liquid capacitive micro inclinometer.

In the followings, method for fabrication of the invented liquid capacitive micro inclinometer will be described by illustrating its preferred embodiments. FIG. 4 shows the flowchart of the method for fabrication of the invented liquid capacitive micro inclinometer, while FIGS. 5a to 5f illustrate certain steps of the fabrication method. As shown in FIG. 4, in the preparation of the liquid capacitive micro inclinometer of this invention, at step 401, a first substrate 10 is prepared. The material of the first substrate 10 is not limited to any particular material. However, the substrate used in the standard CMOS process, i.e., the silicon substrate is preferable, because this helps in fabricating the invented inclinometer in the standard CMOS process. Other rigid materials or any material suited in the CMOS process may also be used in preparing the first substrate 10. In the following, at step 402 a stack of material layers is formed on the first substrate 10. The stack may include: a first dielectric layer on the first substrate 10, alternating layers of metal and dielectric on the first dielectric layer and vias in these layers. These material layers form a stack structure, with patterns of the detector and the reading circuit 35 formed therein. Methods suited in the preparation of the stack structure include any commercially available process in the preparation of circuit structure and/or microstructure. Among them, the standard CMOS process is preferable.

The reading circuit 30 may be any circuit structure obtained from any commercially available electronic design automation tool. For those having ordinary skills in the art, it is obvious to design the reading circuit 30 and produce the circuit on the first substrate 10. Details thereof are thus omitted.

As to the preparation of the detector 100, in this particular example the differential electrodes 21, 22 and the common electrode 23 are formed in at least one metal layer, such as the third metal layer, in the stack. Method for preparation of the electrode assembly includes, following the preparation of particular metal layers, forming patterns of the differential electrodes 21, 22 and the common electrode 23 using, for example, wet etching, forming dielectric layer surrounding and on the electrode patterns and repeating these steps until the stack structure is completed. In these steps, the differential electrodes 21, 22 have substantial the same or corresponding shapes and substantially identical regional area. The common electrode 23 is formed in the inner peripheral of the differential electrodes 21, 22. Notches 21a, 22a are formed in the differential electrodes 21, 22 from their edge facing the common electrode 23. The common electrode 23 further includes extruders 23a extending into the notches 21a, 22a. Patterns of the electrodes having these and other features are formed in the stack structure using the conventional art. In addition, it is also possible to use the conventional art to form additional pair(s) of differential electrodes in the same plane or in substantially the same plane. For those having ordinary skills in the art, it is easy to prepare the invented electrode patterns in the stack structure by reading the disclosure and the drawings of this invention. Details thereof are thus omitted.

In the stack of material layers, a support structure 24 including a plurality of metal layers, a plurality of dielectric layers and a plurality of vias may be included. The support structure generally includes a plurality of metal layers and a plurality of dielectric layers, with a plurality of vias connecting them, to strengthen their structure. The support structure 24 forms a structure to support a sealed chamber. Such structure support structure 24 may be prepared using the standard CMOS process, simultaneously when the reading circuit 30 and the electrodes 21, 22 and 23 are prepared. Details of the preparation are known to those having ordinary skills in the art and are thus omitted.

Figure 5A:
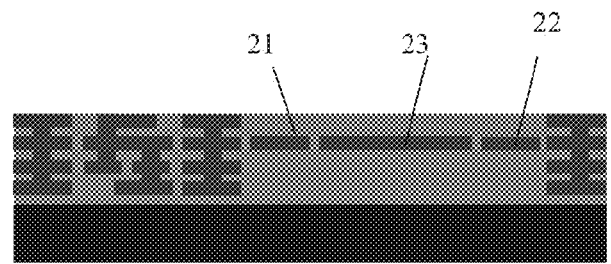
FIGS. 5a to 5f illustrate certain steps of the fabrication method of FIG. 4.

In other embodiments of this invention, the electrodes 21, 22, 23 are not prepared in the third metal layer but in another metal layer. In addition, in some embodiments the 3 electrodes 21, 22, 23 are not prepared in one single metal layer. In such embodiments, the electrodes 21, 22, 23 would include a plurality of metal layers and dielectric layer(s) between them. If necessary, they may also include vias. In addition, the inclinometer 100 may include more than one pair of differential electrodes. All these designs are variations of this invention and may be realized by those skilled in the art, using commercially available materials and processes. As to materials for the metal layers, the dielectric layer and the vias, they are not limited to particular materials. Suited materials are known to those having ordinary skills in the art. Generally speaking, the metal layers may be aluminum, the dielectric layers may be silicon dioxide and the vias may be copper. The structure so prepared is shown in FIG. 5a. As shown in this figure, a dielectric layer is formed above the electrodes 21, 22, 23.

Figure 5B:
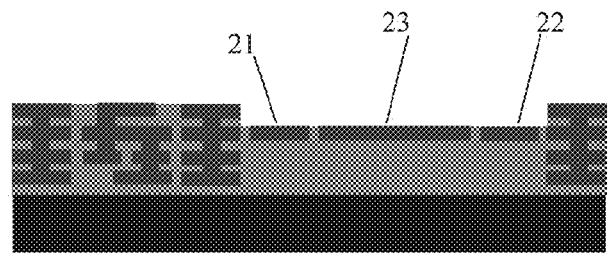
Figure 5C:
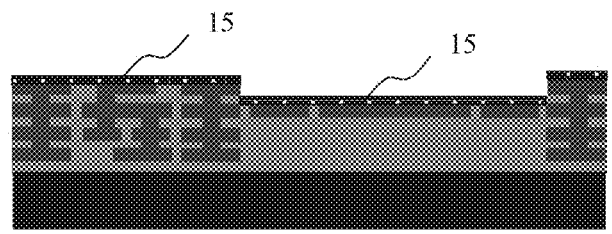

Following that, at step 403 dielectric material or dielectric material and metal material other than that forming the electrodes 21, 22, 23 are removed, until the electrodes 21, 22 and 23 are released. The result is shown in FIG. 5b. At step 404 a lubrication layer (not shown) is applied on the electrodes 21, 22, 23. Material for the lubrication layer may be any that substantially eliminates or reduces the capillary action of the electrodes at their surface. In the preferred embodiments of this invention, the lubrication layer is a Teflon layer, while other materials that provide identical or similar effects may also be used. Method for applying the lubrication layer is not limited, while in some preferred embodiments the lubrication layer is applied by coating. Thickness of the lubrication layer is not a technical limitation but should be in a range that won't impact the preciseness of the inclinometer. The resulted structure is shown in FIG. 5c.

Figure 5D:
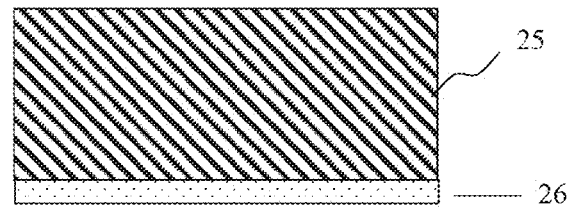
Figure 5E:
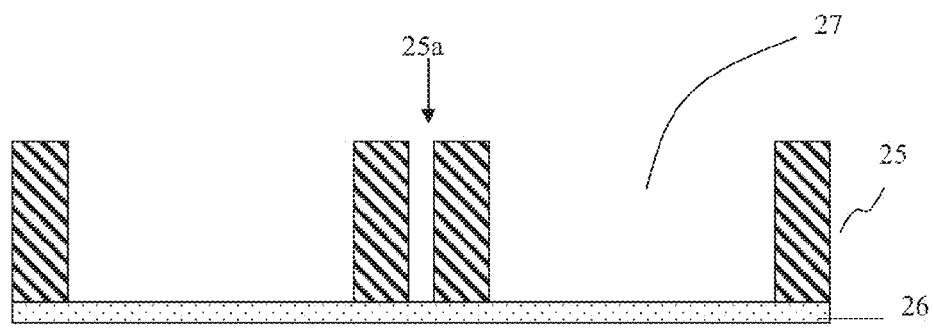

In the following, at step 405 a second substrate 26 is prepared. Material for the second substrate 26 is not limited but is preferably a material that is rigid and easy to process. In the preferred embodiments of this invention, the second substrate 26 is a glass substrate, while in other embodiments the second substrate 26 may be plastic, resin, glass fiber, metal, ceramic or a composite material. At step 406 a material layer for the partition walls 25 is prepared on the second substrate 26. Again, material for the partition walls 25 is not limited to any particular material, while in the preferred embodiments this material layer 25 is a photoresist layer, so to simplify the process. Suitable photoresist material for the partition walls includes SU-8 and other photoresist materials. The partition wall material 25 may be formed on the second substrate 26 using any suited method. Although thickness of the partition wall layer 25 is not a technical limitation, the partition wall layer 25 is preferably in a thickness sufficient to create a space defined in the partition walls with sufficient volume to accommodate the immersing liquid. In the preferred embodiments, the thickness of the partition wall layer 26 is preferably between 100 and 2,000 um, more preferably between 200 and 1,000 um. The material layer so obtained is shown in FIG. 5d. At step 407 a recession 27 is formed in the material layer 25, to serve as a chamber to contain the immersing liquid. The recession 27 may be formed using any suitable method, such as removing parts of the partition wall layer 25 by e.g. wet etching. Other methods such as laser etching are also applicable. If necessary, cutting lines 25a may be formed at edges of each unit of the partition walls. The material layers so obtained include the second substrate 26, a recession 27 and its partition walls 25, as shown in FIG. 5e.

Figure 5F:
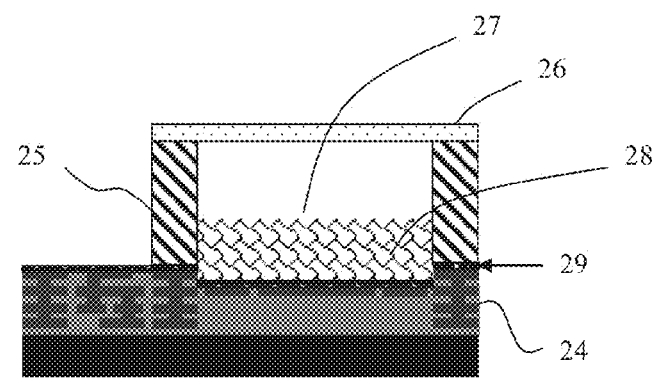

Later, at step 408 immersing liquid 28 is added in the recession 27. The immersing liquid 28 may be a conductive or non-conductive liquid. If the liquid 28 is conductive, it may be an electrolyte liquid, a magnetic liquid, a liquid metal or a liquid containing nano metal particles. If the liquid 28 is not conductive, it may be a liquid of a higher proportion and a lower viscosity, such as silicone oil. Volume of the immersing liquid 28 being introduced into the recession 27 is not a technical limitation. In some preferred embodiments, volume of the immersing liquid 28 is approximately half that of the chamber defined by the partition walls 25. At step 409 adhesives 29 are applied in the open edges of the partition walls 25. At step 410 the assembly of the first substrate 10 is flipped and positioned on the second substrate 26, such that the electrodes 21, 22, 23 are positioned in the recession 27 and the support structure 24 of the first substrate 10 pushes against the open edges of the partition walls 25. At step 411 the first substrate 10 is affixed to the second substrate 26, with any suitable method that cures the adhesives and firmly affixes the two assemblies. A plurality of inclinometer is thus obtained. In the following, units of the inclinometer are separated at the cutting lines 25a to obtain the invented inclinometer. The structure of the obtained inclinometers is shown in FIG. 5f.

The liquid capacitive micro inclinometer of this invention has a novel and simple structure. It is easy to fabricate and is compatible with the standard CMOS process. Its reading circuit may be fabricated at the same time when the inclinometer is fabricated, so that the two parts are well integrated. The invented structure provides reduced fabrication costs and time. The invented inclinometer may be fabricated in small size. Experimental samples are in the size of approximately 2.3×3.1 mm, with or without the reading circuit. In addition, the invention provides the possibility of detecting tilt angles in the range of ±90°.

What is claimed is:

1. A liquid capacitive micro inclinometer, comprising a pair of differential electrodes and a common electrode, all positioned in substantially a same plane in a sealed chamber, and immersing liquid filled in the sealed chamber, wherein each differential electrode has the shape of a part of a circular plane.

2. The liquid capacitive micro inclinometer according to claim 1, wherein the differential electrodes respectively have a semicircular shape.

3. The liquid capacitive micro inclinometer according to claim 1, wherein shape of the differential electrodes forms sector of a semicircular, wherein the inclinometer further comprises one or more pair of differential electrodes formed in the same plane, and wherein all differential electrodes have substantially a same shape.

4. The liquid capacitive micro inclinometer according to claim 1, further comprising a reading circuit to generate reading values of capacitance represented by each of the differential electrodes.

5. The liquid capacitive micro inclinometer according to claim 2, further comprising a reading circuit to generate reading values of capacitance represented by each of the differential electrodes.

6. The liquid capacitive micro inclinometer according to claim 3, further comprising a reading circuit to generate reading values of capacitance represented by each of the differential electrodes.

7. The liquid capacitive micro inclinometer according to claim 1, further comprising a lubrication layer provided in at least a partial surface of the differential electrodes and the common electrode.

8. The liquid capacitive micro inclinometer according to claim 1, wherein the common electrode is provided adjacent to the differential electrodes.

9. The liquid capacitive micro inclinometer according to claim 8, wherein the differential electrodes comprise a plurality of notches at their edge facing the common electrode and the common electrode comprises a plurality of extruders extended into the plurality of notches.

10. The liquid capacitive micro inclinometer according to claim 9, wherein shape of the differential electrodes is a sector circular plane and the notches extend to over half radius of the circular plane.

11. The liquid capacitive micro inclinometer according to claim 1, wherein the immersing liquid is selected from the group consisted of a conductive liquid and a dielectric liquid.

12. The liquid capacitive micro inclinometer according to claim 1, wherein the differential electrodes and the common electrode are formed on one silicon substrate.

13. The liquid capacitive micro inclinometer according to claim 12, further comprising a reading circuit to generate reading values of capacitance represented by each of the differential electrodes, wherein the reading circuit is formed on the same silicon substrate of the differential electrodes and the common electrode.

14. The liquid capacitive micro inclinometer according to claim 1, wherein the differential electrodes and the common electrode are formed on a dielectric layer formed on a silicon substrate.

15. A method for preparation of a liquid capacitive micro inclinometer, comprising the steps of:
preparing a first substrate;
forming on the first substrate at least one metal layer;
processing the at least one metal layer to form a pair of first and second electrodes having similar shapes and substantially same area and a third electrode;
preparing a second substrate;
forming a material layer on the second substrate;
forming a space in the material layer;
filling an immersing liquid into the space in the material layer;
overlapping the first substrate on the second substrate, such that the first, second and third electrodes are contained in the space in the material layer; and
combining the first and second substrates;
wherein the first and second substrate have the shape of a part of a circular.

16. The method according to claim 15, wherein the first and second electrodes respectively form a semicircular shape.

17. The method according to claim 15, wherein shape of the first and second electrodes form a sector of a circular and wherein the method further includes a step of forming at least an additional pair of first and second electrodes, at the same time when the first and second electrodes are formed.

18. The method according to claim 17, wherein shape and area of the differential electrodes are identical.

19. The method according to claim 15, wherein the first substrate is a silicon substrate and the second substrate is a substrate selected from the group consisted of a glass substrate and a plastic substrate.

20. The method according to claim 15, wherein the third electrode is formed adjacent to the first and second electrodes.

21. The method according to claim 20, wherein the first and second electrodes respectively include a plurality of notches provided at an edge facing the third electrode and the third electrode includes a plurality of extruders extending into the notches.

22. The method according to claim 21, wherein the first and second electrodes respectively have a sector circular shape and wherein the notches extend to over half radius of the circular plane.

23. The method according to claim 15, wherein the immersing liquid is a liquid selected from the group consisted of a conductive liquid and a dielectric liquid.

24. The method according to claim 15, wherein the first, second and third electrodes are formed in a material layer on the first substrate and wherein the method further comprises a step of forming a material layer on the first substrate after the first substrate is prepared.

25. The method according to claim 24, wherein this material layer includes at least one dielectric layer.

26. The method according to claim 25, wherein the material layer further comprises at least one metal layer and at least a dielectric layer.

27. The method according to claim 15, further comprising a step of forming a reading circuit, when the first, second and third electrodes are formed.

28. The method according to claim 16, further comprising a step of forming a reading circuit, when the first, second and third electrodes are formed.

29. The method according to claim 17, further comprising a step of forming a reading circuit, when the first, second and third electrodes are formed.

30. The method according to claim 24, further comprising a step of forming a reading circuit, when the first, second and third electrodes are formed.

31. The method according to claim 15, further comprising a step of applying a lubrication layer on at least a partial surface of the first, second and third electrodes.

32. The method according to claim 15, wherein the material layer formed on the second substrate is photoresist.

33. The method according to claim 32, wherein the step of forming the space includes removing a part of the material layer.

\* \* \* \* \*